(12) United States Patent
Satterfield et al.

(10) Patent No.: US 8,508,084 B2
(45) Date of Patent: Aug. 13, 2013

(54) POWER TOOL INCLUDING HYBRID ELECTRIC MOTOR DESIGN

(75) Inventors: Roger G. Satterfield, Pickens, SC (US); Stephen C. Hembroff, Sparks, NV (US)

(73) Assignee: Techtronic Power Tools Technology Limited, Tortola (VG)

( * ) Notice: Subject to any disclaimer, the term of this patent is extended or adjusted under 35 U.S.C. 154(b) by 170 days.

(21) Appl. No.: 12/417,777

(22) Filed: Apr. 3, 2009

(65) Prior Publication Data
US 2009/0322166 A1    Dec. 31, 2009

Related U.S. Application Data

(60) Provisional application No. 61/075,805, filed on Jun. 26, 2008.

(51) Int. Cl.
*H02K 7/14* (2006.01)

(52) U.S. Cl.
USPC .............................................. 310/50; 310/62

(58) Field of Classification Search
USPC ............ 310/50, 47, 249, 58, 62–63; 173/217
See application file for complete search history.

(56) References Cited

U.S. PATENT DOCUMENTS

| | | | |
|---|---|---|---|
| 2,082,264 A | 6/1937 | Scruggs | |
| 2,294,713 A | 9/1942 | Boerger | |
| 2,456,571 A | 12/1948 | Turner et al. | |
| 3,344,291 A | 9/1967 | Pratt | |
| 3,426,227 A * | 2/1969 | Miller et al. | 310/180 |
| 3,430,084 A | 2/1969 | Hall et al. | |
| 3,430,709 A * | 3/1969 | Miller | 173/205 |
| 3,456,740 A | 7/1969 | Paule et al. | |
| 3,651,707 A * | 3/1972 | Rees | 74/421 A |
| 4,342,929 A | 8/1982 | Horne | |
| 4,574,471 A | 3/1986 | Dibbern, Jr. et al. | |
| 4,979,303 A | 12/1990 | Han | |
| 5,349,785 A | 9/1994 | Nickels, Jr. et al. | |
| 5,575,366 A | 11/1996 | Zenmei et al. | |
| 5,624,000 A * | 4/1997 | Miller | 173/216 |
| 5,903,073 A | 5/1999 | Mukai | |
| 6,144,121 A * | 11/2000 | Ishida et al. | 310/50 |

(Continued)

FOREIGN PATENT DOCUMENTS

| CN | 2858198 Y | 1/2007 |
|---|---|---|
| EP | 1100182 A1 | 5/2001 |

(Continued)

*Primary Examiner* — Tran Nguyen
*Assistant Examiner* — Eric Johnson
(74) *Attorney, Agent, or Firm* — Michael Best & Friedrich LLP

(57) ABSTRACT

An electric motor for use with a power tool includes a motor housing having a first end and an open second end, a first bearing coupled to the first end of the motor housing, a plurality of magnets coupled to the motor housing, and an armature having a first end and a second end. The first end of the armature is rotatably supported by the first bearing. The second end of the armature protrudes from the open second end of the motor housing without being supported by the open second end of the motor housing. The electric motor also includes a second bearing coupled to the second end of the armature. The motor housing is supportable by a first portion of the power tool housing. The second bearing is supportable by a second portion of the power tool housing.

16 Claims, 6 Drawing Sheets

(56) References Cited

U.S. PATENT DOCUMENTS

| | | |
|---|---|---|
| 6,294,857 B1 | 9/2001 | Nakane |
| 6,454,640 B1 | 9/2002 | Siedler et al. |
| 6,632,128 B2 | 10/2003 | Berger et al. |
| 6,661,148 B2 * | 12/2003 | Oomori et al. ............... 310/239 |
| 6,719,541 B2 | 4/2004 | Bundy |
| 6,762,521 B2 | 7/2004 | Peter et al. |
| 6,846,230 B2 | 1/2005 | Jonas |
| 6,909,207 B2 | 6/2005 | Ikeda et al. |
| 6,966,391 B2 | 11/2005 | Tang |
| 7,100,705 B2 * | 9/2006 | Ortt et al. ..................... 173/1 |
| 7,121,445 B2 | 10/2006 | Hollis |
| 7,156,191 B2 * | 1/2007 | Lau ............................. 173/216 |
| 7,196,440 B2 | 3/2007 | Lamprecht |
| 7,213,316 B2 | 5/2007 | Kato |
| 7,308,950 B2 | 12/2007 | Faatz et al. |
| 7,323,797 B2 | 1/2008 | Furui et al. |
| 7,330,006 B2 | 2/2008 | Iwata et al. |
| 2004/0104636 A1 * | 6/2004 | Ortt et al. ................. 310/154.08 |
| 2007/0007026 A1 | 1/2007 | Hofmann |
| 2007/0182269 A1 * | 8/2007 | Takahashi et al. ............ 310/217 |
| 2007/0205679 A1 | 9/2007 | Terauchi et al. |
| 2007/0252488 A1 | 11/2007 | Kusase et al. |

FOREIGN PATENT DOCUMENTS

| | | |
|---|---|---|
| GB | 2225490 A | 5/1990 |
| GB | 2385715 A | 8/2003 |
| WO | 2004107536 A1 | 12/2004 |
| WO | 2008010467 A1 | 1/2008 |
| WO | 2008010468 A1 | 1/2008 |
| WO | 2008026987 A1 | 3/2008 |

* cited by examiner

POWER TOOL INCLUDING HYBRID ELECTRIC MOTOR DESIGN

RELATED APPLICATIONS

This application claims priority to U.S. Provisional Patent Application Ser. No. 61/075,805 filed on Jun. 26, 2008, the entire content of which is incorporated herein by reference.

FIELD OF THE INVENTION

The present invention relates to power tools, and more particularly to electric motors for use with power tools.

BACKGROUND OF THE INVENTION

In the field of power tools, and specifically in the field of battery-powered hand tools such as drills, two types of motors are known and used—a self-contained "can-type" or "can" motor and an "open frame" motor.

Can motors typically include a housing in the form of a cylindrical can in which essentially all of the components of the motor are received, including the armature, magnets, brushes, motor housing, fan, and bearings. Most DC battery-powered tools incorporate a can motor to drive the power tool output due to the simplicity of assembly and low cost of can motors. Can motors are often preassembled, thereby simplifying assembly of the can motors in power tools. Because the motor components are disposed within a can, a can motor can be operated without the motor being mounted in a product. Typically, can motors include several mounting holes on the front of the can to facilitate attachment to a product or gear train. Such mounting holes on the front of the can simplifies alignment of the motor shaft with the product or gear train with which the can motor is used.

Though assembly of can motors into a power tool is oftentimes fairly simple and cost efficient, the power tool housing must be sized to accommodate the can. For example, screw bosses in the power tool housing must be located outside of the outer periphery of the can, which often creates dead or unused space between the tool housing and the motor, often imposing limitations on the size of the power tool. The larger the power tool, the more difficult it is for some users to operate. For example, increasing the length of a drill also increases the distance of the drill's center of mass from the operator's hand, requiring more work from the operator to maneuver the drill, potentially leading to premature fatigue.

Can motors also often restrict the dimensions of the fan used to cool the motor because the outer diameter of the fan is limited by the inner diameter of the can. In addition, air circulation within the can is oftentimes limited. The combination of the limited fan size and limited air circulation in the can often decreases the cooling capability of the can motor.

Open frame motors are often used in power tools, but typically at a greater cost and greater difficulty of manufacturing compared to can motors. Open frame motors typically include an armature and a permanent magnet rolled flux ring field. Open frame motors must be installed within a power tool prior to their operation because the individual components of the motor are not contained within a common housing inside the tool housing as in a can motor. Open frame motors typically contain fewer components than can motors (specifically, the can or can housing is omitted). The components of an open frame motor are often installed in tool housings individually, often leading to difficulty associated with controlling the component centerline relationships and attachment of the bearings, gear train, and permanent magnet field to the power tool housing. As a result, tool housings incorporating open frame motors must often be manufactured using closer or tighter tolerances.

SUMMARY OF THE INVENTION

The present invention provides, in one aspect, an electric motor for use with a power tool including a housing. The electric motor includes a motor housing having a first end and an open second end, a first bearing coupled to the first end of the motor housing, a plurality of magnets coupled to the motor housing, and an armature having a first end and a second end. The first end of the armature is rotatably supported by the first bearing. The second end of the armature protrudes from the open second end of the motor housing without being supported by the open second end of the motor housing. The electric motor also includes a second bearing coupled to the second end of the armature. The motor housing is supportable by a first portion of the power tool housing. The second bearing is supportable by a second portion of the power tool housing.

The present invention provides, in another aspect, a power tool including a power tool housing and a motor housing supported by a first portion of the power tool housing. The motor housing has a first end and an open second end. The power tool also includes a first bearing coupled to the first end of the motor housing, a plurality of magnets coupled to the motor housing, and an armature having a first end and a second end. The first end of the armature is rotatably supported by the first bearing. The second end of the armature protrudes from the open second end of the motor housing without being supported by the open second end of the motor housing. The power tool further includes a second bearing coupled to the second end of the armature and supported by a second portion of the power tool housing.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
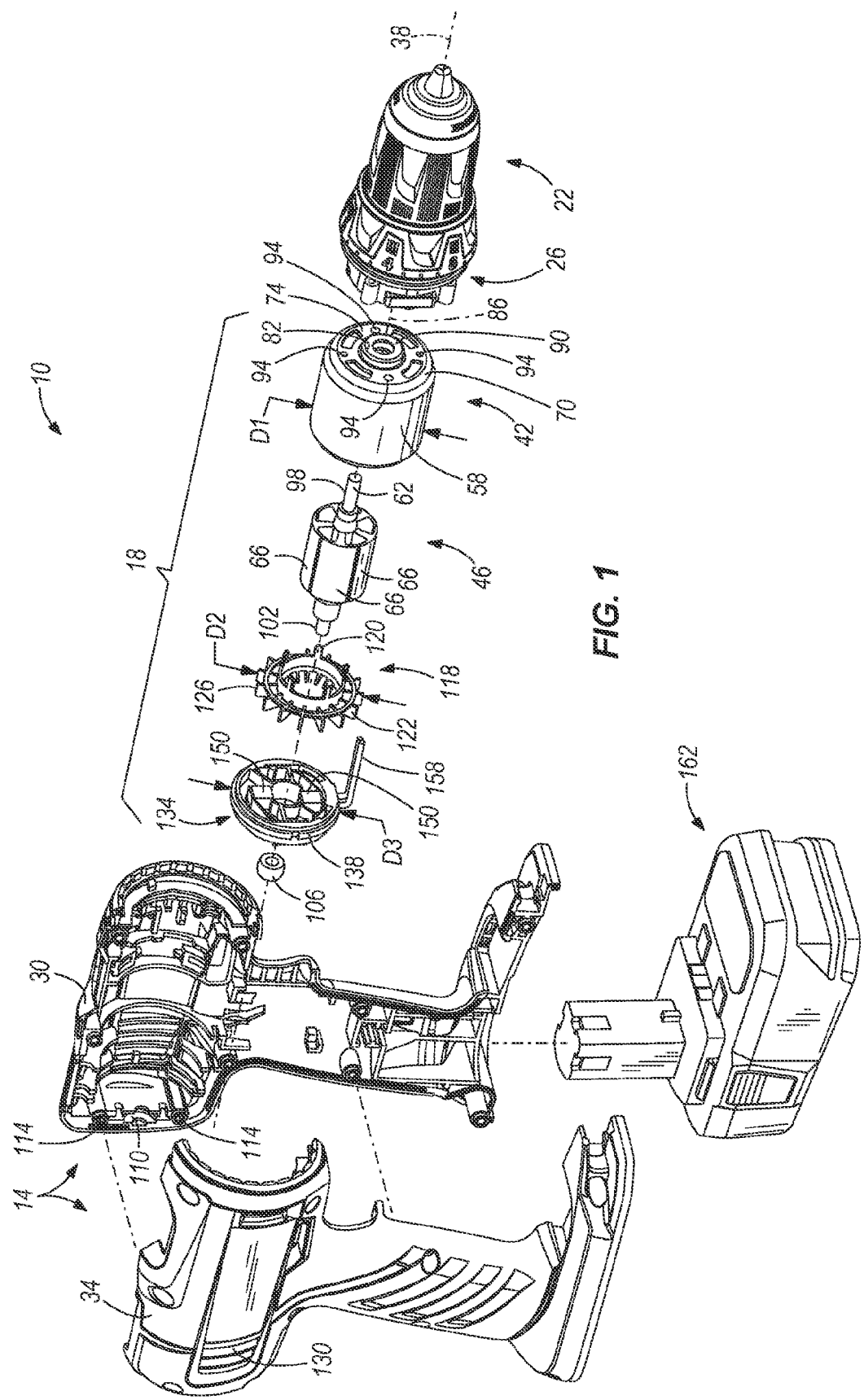
FIG. 1 is an exploded perspective view of a power tool and an electric motor of the present invention.
Figure 2:
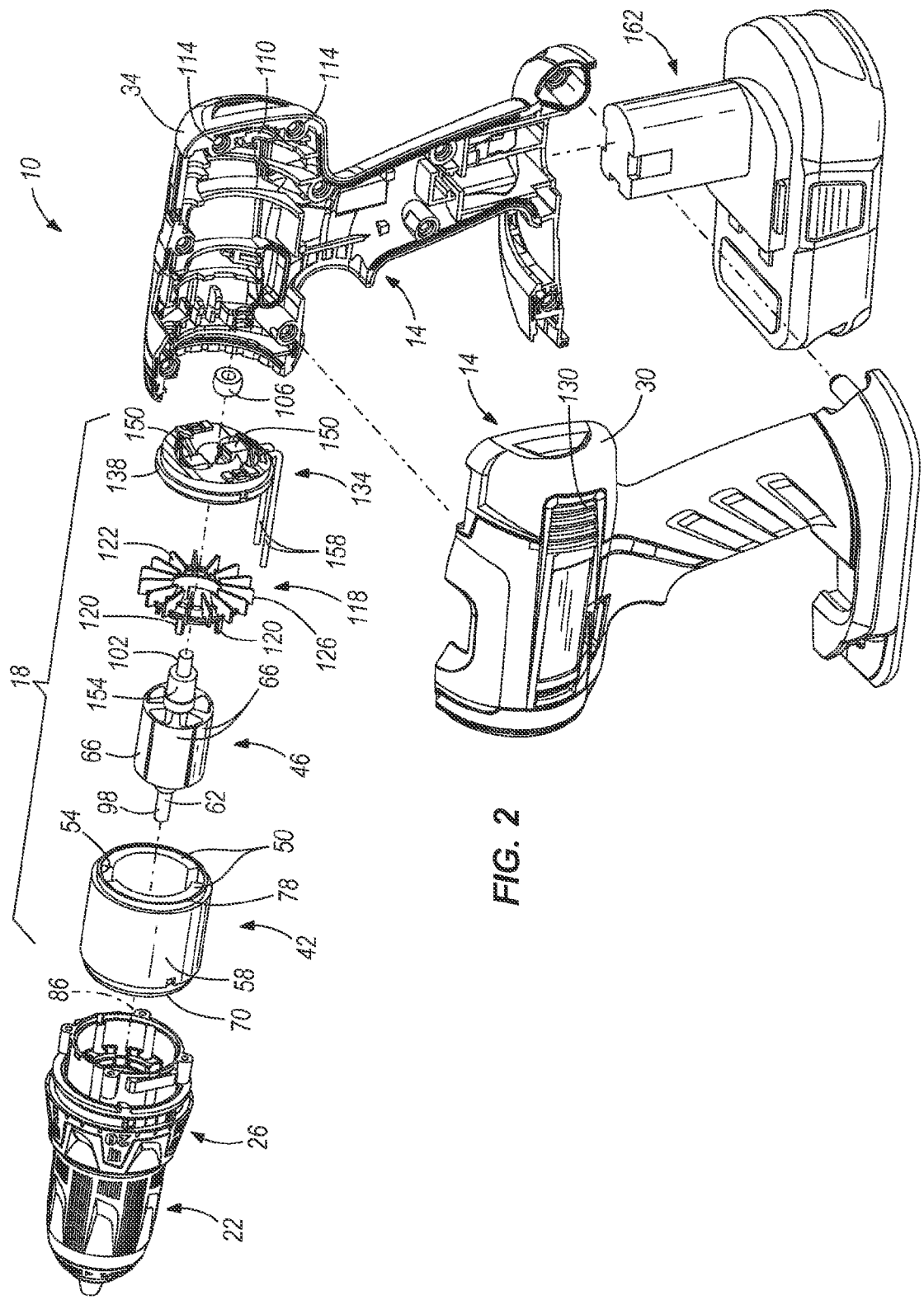
FIG. 2 is a reverse, exploded perspective view of the power tool and electric motor of FIG. 1.
Figure 3:
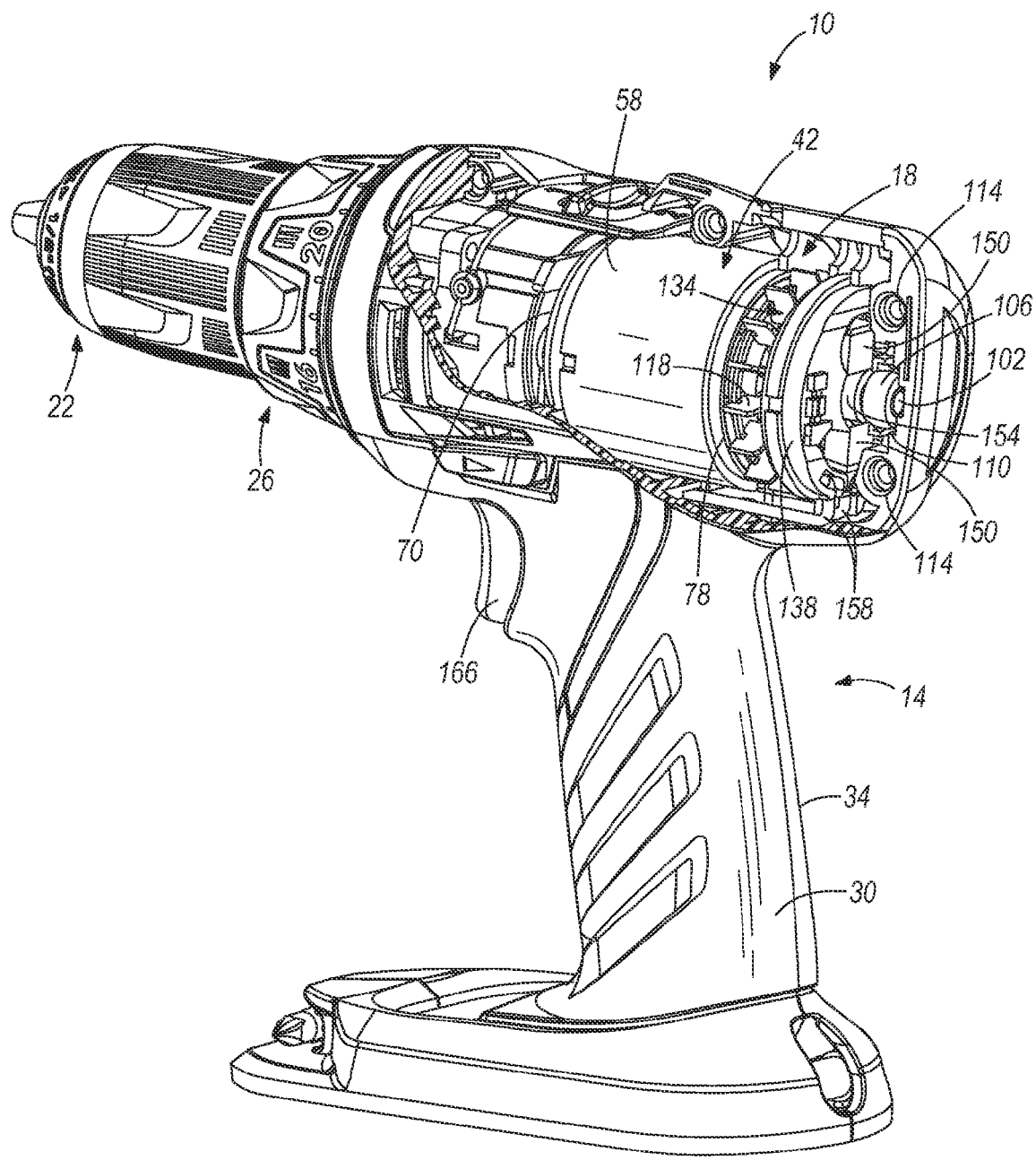
FIG. 3 is an assembled, rear perspective view of the power tool of FIG. 1, illustrating a portion of the power tool housing cut away to expose the electric motor.
Figure 4:
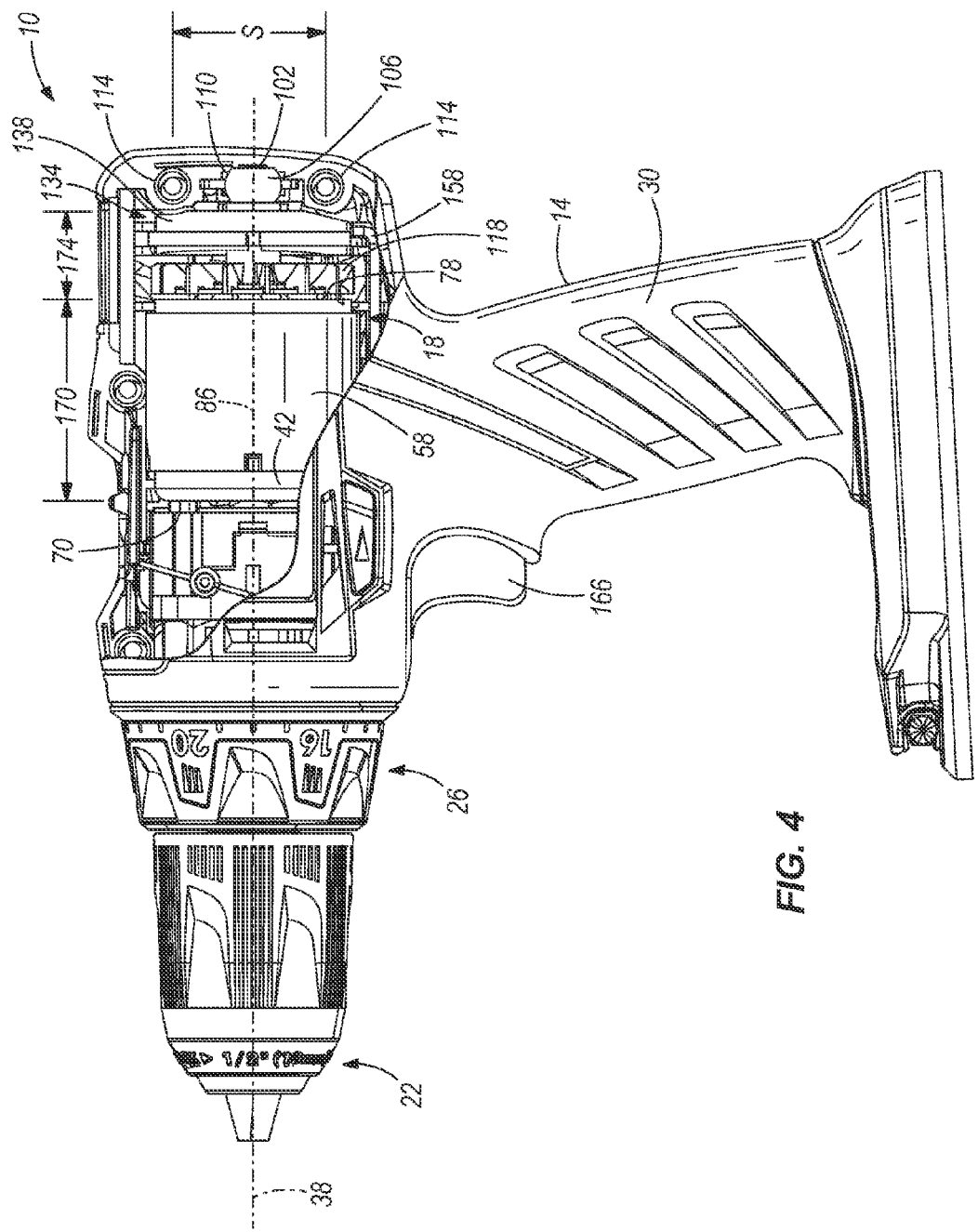
FIG. 4 is a side view of the power tool of FIG. 3.

FIGS. 1 and 2 illustrate a battery-operated power tool 10 including a housing 14, a "hybrid" can-type/open frame electric motor 18 supported within the housing 14, and an output (e.g., a chuck assembly 22) drivably coupled to the motor 18 through an intermediate gear train or transmission 26 (see FIGS. 3 and 4). The tool housing 14 is formed of two interconnected housing shells 30, 34. Alternatively, the tool housing 14 may be formed using more than two shells 30, 34. While the motor 18 is shown and described in connection with the power tool 10 (i.e., a hand-held drill), it should be understood that the motor 18 may be used with other battery-operated tools or corded tools. As another alternative, the motor 18 may be used with other products or devices besides power tools.

With reference to FIGS. 1 and 2, the motor 18 includes a motor housing 42 and an armature 46 supported for rotation within the motor housing 42. With reference to FIG. 2, opposed permanent magnets 50 are coupled to an inner surface 54 of the motor housing 42 (using adhesives, etc.) and arranged such that the inwardly-facing poles of the magnets 50 are different from each other (i.e., one of the magnets 50 has an inwardly-facing "north" pole, while the other magnet 50 has an inwardly-facing "south" pole). A flux ring 58 is disposed about the motor housing 42 to focus the magnetic field generated by the magnets 50 within the interior of the motor housing 42.

The armature 46 includes a shaft 62 and a plurality of coils or windings 66 coupled to the shaft 62 for co-rotation with the shaft 62. In operation of the motor 18, an electrical current is passed through each of the windings 66 in a direction substantially normal to the flux lines of the magnetic field generated by the permanent magnets 50, thereby imparting a torque on the armature 46. The direction of the electrical current through the windings 66 is switched during rotation of the armature 46 by a brush assembly 134 and commutator 154 (described in greater detail below), thereby resulting in a substantially continuous application of torque on the armature 46. In this manner, the motor 18 is operable as a permanent magnet motor. Alternatively, electromagnets may be substituted for the permanent magnets 50 on the motor housing 42.

With reference to FIG. 1, the motor housing 42 includes a first end 70 having a face plate 74 and an open second end 78 (see FIG. 2). With reference to FIG. 1, the face plate 74 includes an aperture 82 coaxial with a longitudinal axis 86 of the motor 18 in which a bearing 90 (e.g., a ball bearing, a bushing or sleeve bearing, etc.) is received (e.g., using an interference or press-fit, etc.). The face plate 74 also includes a plurality of mounting apertures 94 spaced from the longitudinal axis 86. As is discussed in greater detail below, the mounting apertures 94 facilitate alignment and interconnection of the motor 18 with other components of the power tool 10 (e.g., the transmission 26). The mounting apertures 94 may be threaded to receive corresponding threaded fasteners to interconnect the motor 18 with the transmission 26.

With reference to FIG. 1, a first or front end 98 of the shaft 62 is rotatably supported by the bearing 90 in the face plate 74. The front end 98 of the shaft 62 may be secured to the bearing 90 using an interference or press-fit. Although not shown in the drawings, the front end 98 of the shaft 62 may include a coupling or one or more features defined thereon (e.g., splines, a keyway, etc.) to facilitate interconnection with the transmission 26 of the power tool 10.

With reference to FIG. 4, the entire length of each of the windings 66 is enclosed within the motor housing 42, while a second or rear end 102 of the shaft 62 protrudes from the open end 78 of the motor housing 42 without being supported by the open end 78 of the motor housing 42. The rear end 102 of the shaft 62 is rotatably supported by a bearing 106 (e.g., a ball bearing, a bushing or sleeve bearing, etc.) directly supported by the tool housing 14 (see also FIGS. 1 and 2). Specifically, each housing shell 30, 34 includes a mount or receptacle 110 in which the bearing 106 is at least partially received and supported (only one of which is shown in FIGS. 3 and 4). The bearing 106 is captured within the receptacles 110 when the housing shells 30, 34 are connected, thereby securing the bearing 106 in the tool housing 14. The receptacles 110, and therefore the bearing 106, are coaxial with the longitudinal axis 86 of the motor 18 to maintain the alignment of the armature 46 with the longitudinal axis 86.

With continued reference to FIGS. 3 and 4, each of the tool housing shells 30, 34 includes a fastening boss 114 on either side of the receptacle 110. When the housing shells 30, 34 are interconnected, corresponding fasteners are received in the bosses 114 to secure the housing shells 30, 34 to each other. Because the bearing 106 is positioned outside the motor housing 42, the bosses 114 may be positioned relatively close to the receptacle 110 in each of the shells 30, 34. Specifically, the bosses 114 may be spaced from each other by a dimension S that is less than an outer diameter D1 of the motor housing 42 (see FIGS. 1 and 4). In contrast, a conventional drill using a can motor typically includes fastening bosses on either side of the can separated by a distance that is greater than the outer diameter of the can. As such, by positioning the bearing 106 outside the motor housing 42, the spacing between the fastening bosses 114 on either side of the bearing 106 may be reduced, thereby allowing the overall size of the rear of the tool housing 14 to be reduced.

With reference to FIGS. 1 and 2, the motor 18 also includes a fan 118 coupled for co-rotation with the armature 46. Specifically, the fan 118 is coupled to the shaft 62 between the plurality of windings 66 and the rear end 102 of the shaft 62 using a plurality of tabs 120 on the fan 118 that are received between adjacent windings 66 on the armature 46. Adhesive may be used to secure the fan 118 to the armature 46. When the armature 46 is inserted into the motor housing 42, the fan 118 remains located outside the motor housing 42 between the open end 78 of the motor housing 42 and the bearing 106. By positioning the fan 118 outside the motor housing 42, the size of the fan 118 is not limited by the size of the motor housing 42 (specifically, the outer diameter D1 of the motor housing 42). With reference to FIG. 1, the fan 118 includes a plurality of blades 122 having respective blade tips 126 that circumscribe an outer diameter D2 of the fan 118. As shown in FIGS. 1 and 4, the outer diameter D2 of the fan 118 is at least as large as the outer diameter D1 of the motor housing 42. Alternatively, the fan 118 may be sized such that its outer diameter D2 is greater than the outer diameter D1 of the motor housing 42. With reference to FIG. 1, each of the housing shells 30, 34 includes a plurality of cooling or exhaust apertures 130 proximate the fan 118 when the power tool 10 is assembled. In operation of the power tool 10, rotation of the fan 118 with the armature 46 generates an airflow through the motor 18 to cool or remove heat from the motor 18. The heated airflow is subsequently exhausted through the apertures 130 in the tool housing 14.

Figure 6:
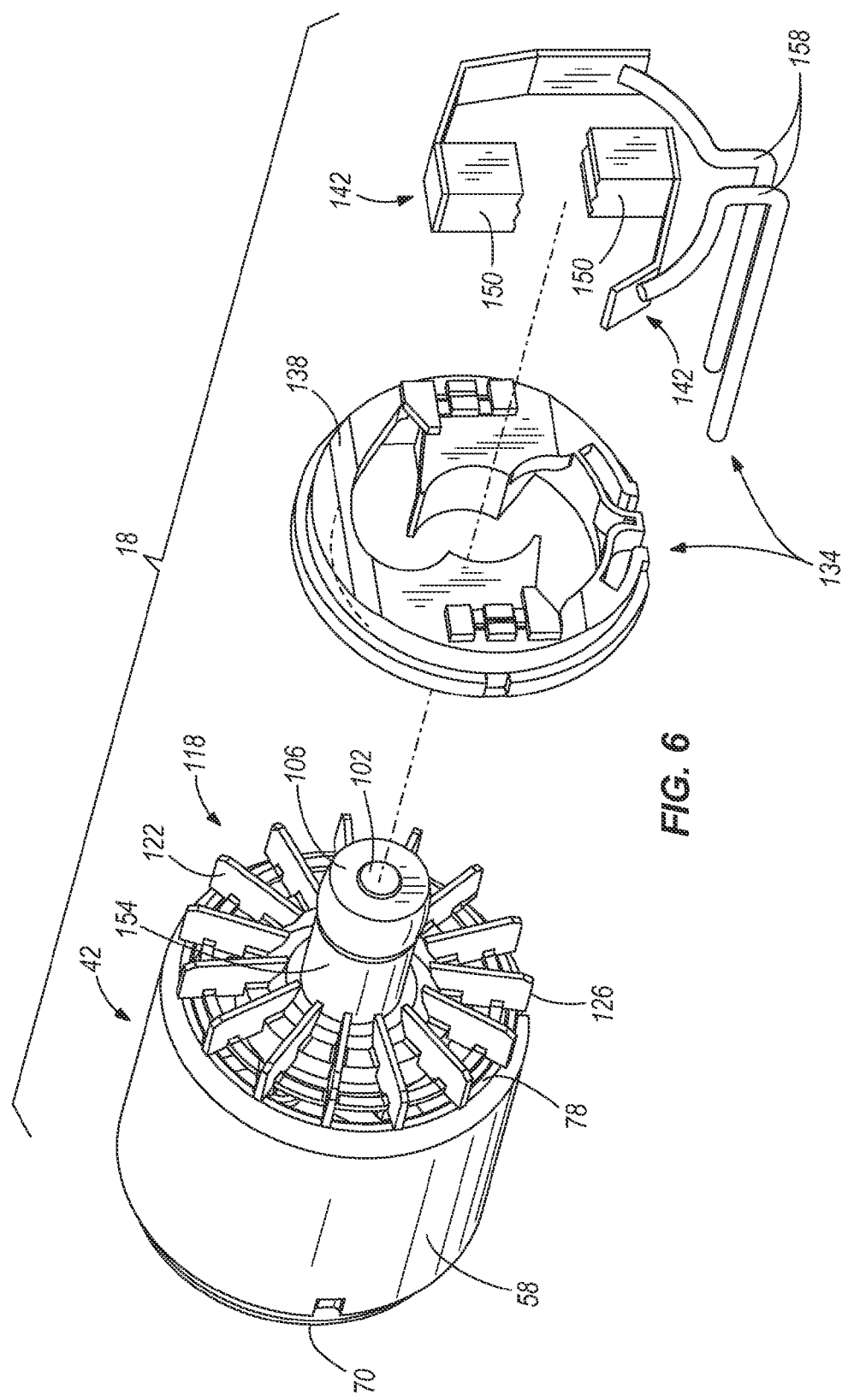
FIG. 6 is an exploded, rear perspective view of a brush assembly of the electric motor of FIG. 1.

The power tool 10 further includes a brush assembly 134 supported by the power tool housing 14 and positioned outside the motor housing 42 between the open end 78 of the motor housing 42 and the rear end 102 of the shaft 62 (see FIGS. 3 and 4). As shown in FIG. 6, the brush assembly 134 includes a holder 138 supported directly by the power tool housing 14 and a plurality of brushes 142 supported by the holder 138. With reference to FIG. 1, the holder 138 defines an outer diameter D3 that is at least as large as the outer diameter D1 of the motor housing 42. Alternatively, the holder 138 may be sized such that its outer diameter D3 is approximately equal to, greater than, or less than the outer diameter D1 of the motor housing 42. In addition to supporting the brushes 142, the brush holder 138 acts as a baffle to redirect the airflow generated by the fan 118 outside the tool housing 14 through the ventilation ports or cooling apertures 130 in the tool housing 14 (see FIGS. 1 and 2).

Figure 5:
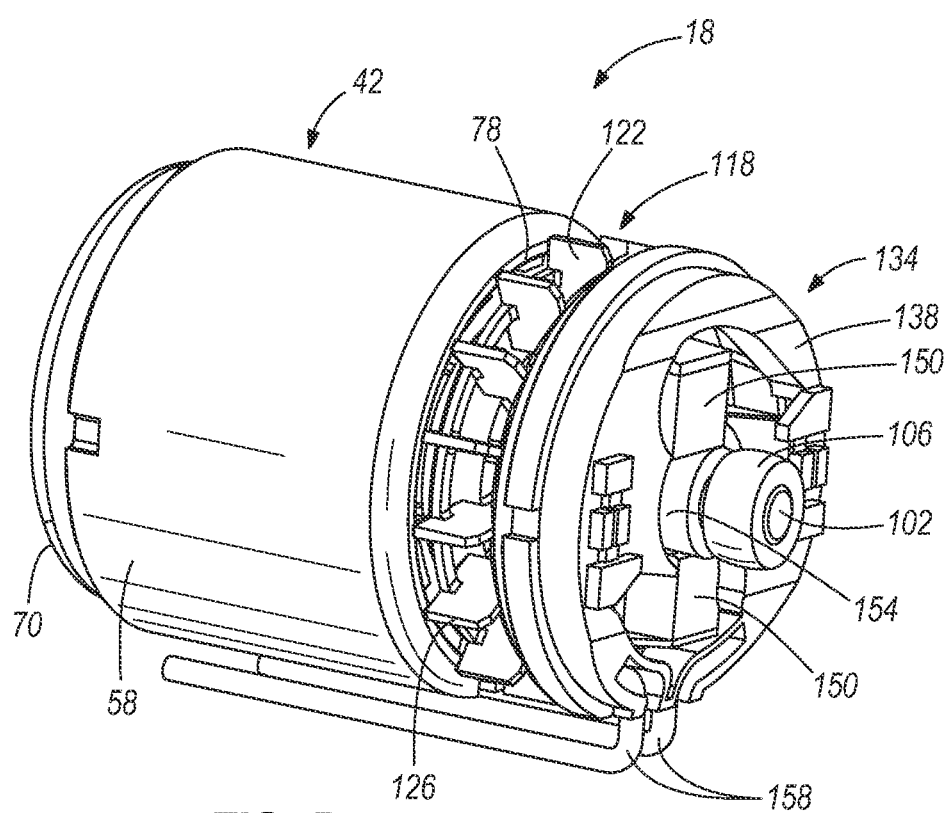
FIG. 5 is an assembled, rear perspective view of the electric motor of FIG. 1.

With reference to FIG. 6, each of the brushes 142 includes a contact pad 150 for slidably engaging the commutator 154 on the armature 46, which is responsible for reversing the direction of current flow through the windings 66 during operation of the motor 18. Each of the brushes 142 also includes an electrical lead 158 to electrically connect to a power source (e.g., a battery 162 of the power tool 10, etc.). As shown in FIGS. 5 and 6, the electrical leads 158 initially extend from the brush holder 138 in a direction substantially normal to the longitudinal axis 86 of the motor 18. Specifically, the electrical leads 158 extend downwardly from the holder 138, and then extend in a direction parallel to the axis 86 toward a trigger switch 166 of the power tool 10 (see FIG. 4). In contrast, a conventional drill using a can motor typically includes a brush assembly positioned inside the can and electrical leads extending from the rear of the can in a direction substantially parallel with the longitudinal axis of the can motor before being redirected forwardly toward the trigger switch of the drill. As such, by positioning the brush assembly 134 outside the motor housing 42, the electrical leads 158 need not be redirected in this manner, thereby allowing the overall size (i.e., length) of the rear of the tool housing 14 to be reduced to provide a more compact power tool 10. Reducing the overall size of the power tool 10, in turn, would allow the operator to more comfortably use the power tool 10 over a longer period of time and reduce premature operator fatigue.

With reference to FIG. 4, the motor 18 achieves the benefits of a can motor and an open frame motor while substantially eliminating the drawbacks or disadvantages associated with each of the can motor and the open frame motor. Specifically, the front portion 170 of the motor 18 including the motor housing 42 and face plate 74 facilitates alignment of the motor 18 with the chuck assembly 22 and the transmission 26 without requiring close or tight tolerances on the tool housing 14 to directly attach the magnets 50 or the front end 98 of the armature shaft 62 directly to the power tool housing 14, which is otherwise necessary with a conventional open frame motor. In addition, incorporating the motor housing 42 with the front portion 170 of the motor 18 obviates the need for a rolled flux ring arrangement, which is otherwise utilized with a conventional open frame motor.

Also, the rear portion 174 of the motor 18 including the fan 118 and the brush assembly 134 may be sized without being constrained or limited by the size of the motor housing 42. As a result, the fan 118 may be sized having an outer diameter D2 approximately equal to or greater than the outer diameter D1 of the motor housing 42 to increase the cooling airflow through the motor 18, thereby enhancing the overall efficiency of the motor. In addition, the electrical leads 158 of the brushes 142 may extend from the holder 138 in a direction substantially normal to the longitudinal axis 86 of the motor 18, thereby reducing the overall size (i.e., length) of the rear of the tool housing 14. Reducing the overall size of the power tool 10, in turn, would allow the operator to more comfortably use the power tool 10 over a longer period of time and reduce premature operator fatigue.

Further, positioning the bearing 106 outside the motor housing 42 allows the spacing between the fastening bosses 114 on either side of the bearing 106 to be reduced, thereby allowing the overall size (i.e., diameter) of the rear of the tool housing 14 to be reduced to provide a more compact power tool 10. Directly supporting the bearing 106 with the tool housing 14 also eliminates the necessity of a commutator bearing plate, which is otherwise required in conventional can motors. The elimination of the commutator bearing plate yields an increased airflow past the motor 18 and reduces the amount of material used in the motor 18, and therefore the weight and cost of the power tool 10.

Various features of the invention are set forth in the following claims.

What is claimed is:

1. An electric motor for use with a power tool including a power tool housing, the power tool housing including a first portion and a second portion, the electric motor comprising:
a motor housing having a first end and an open second end;
a first bearing coupled to the first end of the motor housing and at least partially disposed within the motor housing;
a plurality of magnets coupled to the motor housing;
an armature having a first end and a second end, the first end of the armature being rotatably supported by the first bearing, the second end of the armature protruding from the open second end of the motor housing without being supported by the open second end of the motor housing;
a second bearing coupled to the second end of the armature;
a brush assembly supportable by the power tool housing and positioned outside the motor housing between the open second end of the motor housing and the second end of the armature; and
a fan coupled for co-rotation with the armature, the fan positioned outside the motor housing between the open second end of the motor housing and the brush assembly;
wherein the fan includes a plurality of blades having respective blade tips that circumscribe an outer diameter of the fan, wherein the outer diameter of the fan is greater than or equal to an outer diameter of the motor housing;
wherein the motor housing is supportable by the first portion of the power tool housing, and wherein the second bearing is captured within a receptacle in the second portion of the power tool housing.

2. The electric motor of claim 1, wherein the brush assembly includes:
a brush holder;
at least one brush supported by the brush holder; and
an electrical lead extending from the at least one brush.

3. The electric motor of claim 2, wherein the armature defines a longitudinal axis, and wherein the electrical lead of the at least one brush extends from the brush holder in a direction substantially normal to the longitudinal axis.

4. The electric motor of claim 2, wherein an outer diameter of the brush holder is at least as large as an outer diameter of the motor housing.

5. The electric motor of claim 1, wherein the first bearing is one of a ball bearing and a sleeve bearing.

6. The electric motor of claim 1, wherein the second bearing is one of a ball bearing and a sleeve bearing.

7. A power tool comprising:
a power tool housing;
a motor housing supported by a first portion of the power tool housing, the motor housing having a first end and an open second end;
a first bearing coupled to the first end of the motor housing and at least partially disposed within the motor housing;
a plurality of magnets coupled to the motor housing;
an armature having a first end and a second end, the first end of the armature being rotatably supported by the first bearing, the second end of the armature protruding from the open second end of the motor housing without being supported by the open second end of the motor housing;

a second bearing coupled to the second end of the armature and captured within a receptacle in a second portion of the power tool housing;

a brush assembly supported by the power tool housing and positioned outside of the motor housing between the open second end of the motor housing and the second end of the armature; and a fan coupled for co-rotation with the armature, the fan positioned outside the motor housing between the open second end of the motor housing and the brush assembly;

wherein the fan includes a plurality of blades having respective blade tips that circumscribe an outer diameter of the fan, and wherein the outer diameter of the fan is greater than or equal to an outer diameter of the motor housing.

8. The power tool of claim 7, wherein the brush assembly includes:

a brush holder;

at least one brush supported by the brush holder; and an electrical lead extending from the at least one brush.

9. The power tool of claim 8, wherein the armature defines a longitudinal axis, and wherein the electrical lead of the at least one brush extends from the brush holder in a direction substantially normal to the longitudinal axis.

10. The power tool of claim 8, wherein an outer diameter of the brush holder is at least as large as an outer diameter of the motor housing.

11. The power tool of claim 7, wherein the first bearing is one of a ball bearing and a sleeve bearing.

12. The power tool of claim 7, wherein the second bearing is one of a ball bearing and a sleeve bearing.

13. The power tool of claim 7, wherein the power tool housing includes two interconnected shells, and wherein the receptacle is defined by a combination of the shells.

14. The power tool of claim 13, wherein at least one of the shells includes a plurality of cooling apertures proximate the fan, and wherein the fan is operable to generate an airflow through the motor housing and exhaust the airflow through the cooling apertures.

15. The power tool of claim 13, wherein each of the shells includes a plurality of cooling apertures proximate the fan, and wherein the fan is operable to generate an airflow through the motor housing and exhaust the airflow through the cooling apertures.

16. The power tool of claim 13, wherein the interconnected shells define an interior of the power tool housing, and wherein the fan is directly exposed to the interior of the power tool housing.

\* \* \* \* \*